United States Patent [19]

Uvemo

[11] Patent Number: 5,141,392
[45] Date of Patent: Aug. 25, 1992

[54] CONNECTING ARRANGEMENT BETWEEN IMPELLER SHAFT AND MIXER

[75] Inventor: Peter Uvemo, Solna, Sweden
[73] Assignee: ITT Flygt AB, Solna, Sweden
[21] Appl. No.: 658,950
[22] Filed: Feb. 21, 1991
[51] Int. Cl.⁵ ............................................. F01D 25/00
[52] U.S. Cl. ..................... 415/121.1; 415/216.1; 366/263; 366/293; 403/356; 403/361; 464/51
[58] Field of Search ............... 415/121.1, 121.3, 216.1; 417/430; 366/262, 263, 264, 265, 270, 293; 464/30, 51, 97, 106, 179; 403/354, 356, 361, 290

[56] References Cited

U.S. PATENT DOCUMENTS

| | | |
|---|---|---|
| 2,460,757 | 2/1949 | Kurz ..................................... 366/264 |
| 3,242,692 | 3/1966 | Sweet ..................................... 464/97 |
| 4,456,424 | 6/1984 | Araoka ................................ 415/121.1 |
| 4,650,342 | 3/1987 | Goodwin ............................. 366/264 |

FOREIGN PATENT DOCUMENTS 2112834 10/1971 Fed. Rep. of Germany ...... 464/106
2070687 9/1981 United Kingdom ............. 415/121.1

Primary Examiner—Edward K. Look
Assistant Examiner—Christopher M. Verdier
Attorney, Agent, or Firm—Menotti J. Lombardi

[57] ABSTRACT

The driving shaft (3) of a pump impeller (4) is extended beyond the impeller and supports the mixer (5) at its end. In order to minimize the risk for extensive damage if the mixer should hit a solid body, the shaft (6) of the mixer is very slim and manufactured of an elastic material such as spring steel.

1 Claim, 2 Drawing Sheets

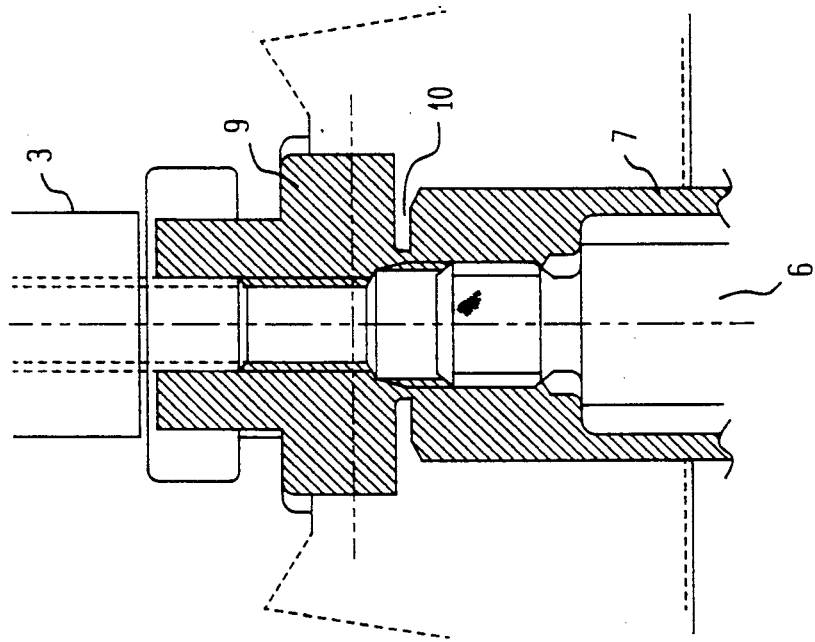

CONNECTING ARRANGEMENT BETWEEN IMPELLER SHAFT AND MIXER

BACKGROUND OF THE INVENTION

The invention concerns a device for a pump and more particularly a construction of a shaft for a mixing means corotating with the pump impeller.

When pumping liquids containing larger amounts of pollutants, certain problems arise. The pump impeller must be so designed that the pollutants do not clog the impeller and in addition the impeller as well as the surrounding housing must be manufactured of a material that can stand wear. This is especially important when pumping in mines where the water contains large amounts of wearing particles.

When pumping in mines it also often occurs that the pollutants have settled and form a layer of a relatively solid consistence at the bottom. This layer is not possible to pump with conventional means, but must be transformed into a solution in one way or another. This may for instance be achieved by help of some sort of mixer.

In order to eliminate the need for a separate mixer, there exist solutions where a pump is provided with an integrated mixer which extends beyond the pump impeller and on the same shaft. The intention is that the mixer shall stir the layer and cause it to mix with the liquid above and thus make it possible to pump.

Such a device has a good function as long as the sediment is not too solid or non-uniform. If this is the fact, the mixer shaft will be deflected when it hits harder material or lumps. If such deflections become too large, the shaft and its bearing might become damaged and cause expensive repairs.

The purpose of this invention is to diminish the risks for damage that make repairs difficult. The characteristics are stated in the claims.

SUMMARY OF THE INVENTION

An object of the invention is to provide an improved device for a pump provided with a mixing means.

According to the invention, the driving shaft of the pump impeller is extended beyond the impeller and supports the mixer at its end, and the shaft of the mixer is thin and comprised of an elastic material such as spring steel.

DESCRIPTION OF THE DRAWINGS

The invention is best understood by reference to FIG. 1 which is a sectional view of the arrangement according to the invention; and FIG. 2 is an enlarged sectional view of the connecting arrangement.

DETAILED DESCRIPTION OF THE PREFERRED EMBODIMENT

Figure 1:
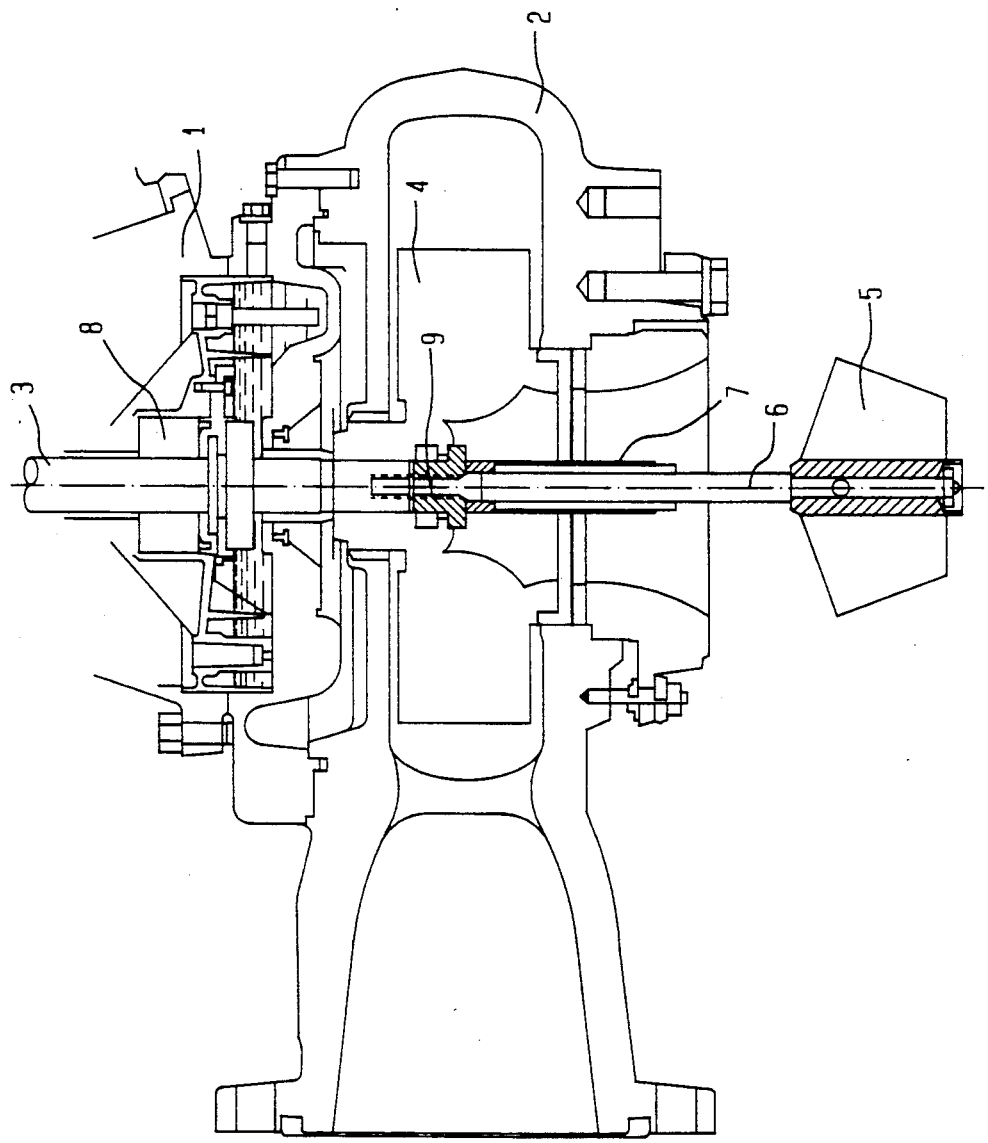

Referring to the drawings there is shown a driving unit 1 and a pump housing 2 with a rotating pump impeller 4 on a shaft 3. A mixing means 5 on a shaft 6 is surrounded by a pipe 7. A bearing 8 and a fastening means 9 for the shaft 6 are provided.

The device according to the invention is thus arranged on a pump of centrifugal type and includes a pump housing 2 with a pump impeller 4 rotating therein. The shaft 3 of the impeller is supported by a lower bearing 8. Beneath the impeller 4 the shaft is provided which has an extension 6 with a mixing means 5 formed like a number of blades on the shaft end.

The shaft 6 is attached to the shaft 3 by means of the fastening means 9 in the area of the pump impeller 3 which acts as a fastening screw for the latter. The shaft 6 is very slim as compared to the shaft 3 and is manufactured of a steel having elastic qualities. The advantage is that the shaft 6 may be deflected when the mixing means 4 hits a solid body, without the bearing 8 for the shaft 3 being damaged. If the stress should be too great, only the lower shaft 6 will be damaged. By designing its attachment 9 to the shaft 3 with a notch and by making it easy to demount, a replacement can be made without extensive costs.

In order to maximize the deflection of the shaft 6, a pipe 7 is arranged around the shaft and attached to the shaft 3. As there is a certain play between the shaft and the pipe, the latter will not be affected until the deflection reaches a certain value. If this should occur, the pipe will protect the other parts of the pump so that only the easily replaceable shaft 6 will be damaged.

What is claimed is:

1. In a submersible pump having a driving unit (1), a pump housing (2), and a rotating pump impeller (4) being mounted within said housing (2) on a shaft (3) of said driving unit (1), the improvement comprising:
   a mixing means (5) extending beyond said housing (2) and being mounted on a flexible spring steel shaft (6) having a thickness less than said shaft (3);
   connecting means having an attachment end (9) for engaging said shaft (3), a pipe end (7) for partially surrounding and engaging said shaft (6), and said connecting means having a notch (10) between said attachment end (9) and said pipe end (7); and
   said pipe end (7) having an inner diameter larger than the outer diameter of said shaft (6) to limit the amount of deflection of said shaft (6) and thereby prevent damage to said impeller (4) and shaft (3).

* * * * *